(12) United States Patent
Beard

(10) Patent No.: US 6,675,610 B2
(45) Date of Patent: Jan. 13, 2004

(54) JEWELRY INCLUDING SHAPE MEMORY ALLOY ELEMENTS

(76) Inventor: Guy Beard, P.O. Box 5328, Jacksonville, FL (US) 32247

( * ) Notice: Subject to any disclaimer, the term of this patent is extended or adjusted under 35 U.S.C. 154(b) by 3 days.

(21) Appl. No.: 09/745,634

(22) Filed: Dec. 23, 2000

(65) Prior Publication Data

US 2002/0005047 A1 Jan. 17, 2002

Related U.S. Application Data

(60) Provisional application No. 60/172,021, filed on Dec. 23, 1999.

(51) Int. Cl.7 ................................................. A44C 5/00
(52) U.S. Cl. ............................................................ 63/3
(58) Field of Search ....................................................... 63/3

(56) References Cited

U.S. PATENT DOCUMENTS

| | | | |
|---|---|---|---|
| 4,138,211 A | | 2/1979 | Kampfer et al. |
| 4,244,140 A | | 1/1981 | Kim |
| 4,357,694 A | * | 11/1982 | Montuori ...................... 63/3 X |
| 4,472,035 A | | 9/1984 | Takamura et al. |
| 4,494,833 A | | 1/1985 | Takamura et al. |
| 4,758,285 A | | 7/1988 | Hodgson et al. |
| 4,772,112 A | | 9/1988 | Zider et al. |
| 4,896,955 A | | 1/1990 | Zider et al. |
| 5,084,108 A | | 1/1992 | Kretchmer |
| 5,733,667 A | | 3/1998 | Nakasuji et al. |
| 6,183,490 B1 | * | 2/2001 | Korbar et al. ............... 606/188 |
| 6,215,073 B1 | * | 4/2001 | Avellanet et al. ......... 174/128.1 |
| 6,266,914 B1 | * | 7/2001 | Johnson et al. ............ 43/42.13 |
| 2001/0042336 A1 | * | 11/2001 | Johnson et al. ............ 43/42.13 |
| 2001/0054299 A1 | * | 12/2001 | White ............................ 63/23 |

* cited by examiner

Primary Examiner—Andrea Chop
(74) Attorney, Agent, or Firm—Thomas C. Saitta

(57) ABSTRACT

Jewelry pieces formed entirely or partially of a shape memory alloy provided with a pre-determined memory shape, where the shape memory characteristic and/or the superelastic characteristic of the alloy is used either in the construction of the piece or to facilitate repair of damaged pieces, since plastically deformed alloy shapes can be corrected by raising the alloy above the phase transition temperature, whereupon the piece resumes it memory shape.

8 Claims, 1 Drawing Sheet

JEWELRY INCLUDING SHAPE MEMORY ALLOY ELEMENTS

This application claims the benefit of U.S. Provisional Patent Application Ser. No. 60/172,021, filed Dec. 23, 1999.

BACKGROUND OF THE INVENTION

This invention relates generally to jewelry composed of metallic components and methods of manufacturing such components, and in particular relates to jewelry, such as necklaces, bracelets, earrings, gem stone settings, and the like, which comprise a metallic component consisting of a shape memory metal alloy in the form of a wire, rod or cable, and in particular a shape memory metal alloy composed of a near stoichiometric alloy of nickel and titanium, such as the alloy known as Nitinol.

A shape memory alloy is an alloy which upon being thermally treated at a very high temperature (typically at least about 500 degrees C. or above) becomes fixed in a given shape due to crystalline alignment, yet when cooled below a transition temperature is relatively easily deformable. Often the alloy is shaped on mandrels or forms to create the desired memory shape. Cooling after forming is preferably performed in a rapid manner through a water quench or rapid air cool. The particular temperatures and treatment times are dependent on the particular alloy being treated and the shape and thickness of the alloy. Superelastic characteristics are inherent in the alloys after particular treatments. Alloys subjected to extreme plastic deformation, such that the wire or rod is bent or kinked, can be returned to the pre-deformation configuration upon reheating to a temperature above the transition temperature, the alloy automatically recovers its pre-deformation fixed shape due to realignment of the crystalline phase.

Nitinol is the name given to a family of intermetallic alloys of nickel and titanium which show unique properties of shape memory and superelasticity. These properties were discovered in near equiatomic Ni—ti alloys at the Naval Ordinance Laboratory. Nitinol comprises from about 50 to 60 percent Ni and about 40 to 50 percent Ti, with less than about 5 percent other elements. A very common alloy is Nitinol-55, which contains approximately 55 percent Ni. The temperature for the shape memory reaction can be varied from below zero degrees C. to about 100 degrees C. go by changing the Ni content of the alloy.

Shape memory is physical phenomenon by which a plastically deformed metal is restored to its original shape by a solid state phase change caused by heating. The explanation of the shape memory response is found in the strong crystallographic relationship between the phase stable at low temperature, called martensite (a close packed monoclinic crystalline structure), and the phase stable at high temperature, called austenite (an ordered body centered cubic phase crystalline structure). A wire or rod to be formed into a particular memory shape is formed, usually on a mandrel or other fixture, and heated to a temperature through the austenite start temperature, A(s), and above the austenite finish temperature, A(f), and held for a suitable time period at temperature. The wire is then rapidly cooled, through the martensite start temperature, M(s), and below the martensite finish temperature, M(f). The stress due to the constrained shape produces twins in the martensite phase which are reversible realignments of the crystal lattice. This phase structure is easily deformed into other shapes by continued realignment and preferential growth of favorably oriented twins. To recover the imparted memory shape, the wire is reheated to above A(f), which reverses the alignment of the twins and reforms the austenite crystalline structure, the wire automatically resuming the memory shape.

Superelasticity, reversible non-linear elastic deformation, is imparted to Nitinol by a particular treatment during the austenite phase. The Nitinol wire is stained, cold-worked, drawn, formed or the like, at a temperature above A(s) but below the maximum temperature at which superelasticity is obtained.

Typical representative properties of Nitinol alloys, which will vary somewhat dependent on composition, are as follows:

| | |
|---|---|
| Melting point | 1310 degrees C. |
| Density | 6.5 gm/cc |
| Young's modulus | 120 Gpa (austenite) |
| | 50 Gpa (martensite) |
| Yield strength | 379 Mpa (austenite) |
| | 138 Mpa (martensite) |
| Ultimate tensile strength | 690 to 1380 Mpa |
| Elongation | up to 20% or more |
| Shape memory | |
| transformation temp. | −50 to 100 Degrees C. |
| recoverable strain | 6.5 to 8.5% |
| superelastic recoverable strain | up to 8% |
| transformation fatigue life | several hundred cycles at 6% strain |
| | 10,000 cycles at 2% strain |
| | 1,000,000 cycles at 0.5% strain |

The following examples illustrate the different characteristics which can be imparted to Nitinol alloys by varying composition and treatment.

| | |
|---|---|
| Alloy #1 (superelastic): | 55.8 ± 0.5 wt % Ni, balance of Ti, |
| | ≤0.5 C, O, Fe |
| | A(s) = −10 degrees C. ± 5 |
| | A(f) = +5 degrees C. ± 5 |
| typical tensile properties of cold-drawn and tempered material: | |
| Upper superelastic plateau stress: | 55 ksi |
| Lower superelastic plateau stress: | 20 ksi |
| Permanent set after 6% strain: | 0.1% |
| Yield strength of the martensite after transition: | 118 ksi |
| Ultimate tensile strength: | 155 ksi |
| Elongation to failure: | 17.5% |
| Maximum strain recovery: | 8% |
| Alloy #2 (high-strength, superelastic): | 55.9 ± 0.5 wt % Ni, balance of Ti, |
| | ≤0.5 C, O, Fe |
| | A(s) = −20 degrees C. ± 5 |
| | A(f) = −5 degrees C. ± 5 |
| typical tensile properties of cold-drawn and tempered material: | |
| Upper superelastic plateau stress: | 70 ksi |
| Lower superelastic plateau stress: | 30 ksi |
| Permanent set after 6% strain: | 0.1% |
| Yield strength of the martensite after transition: | 185 ksi |
| Ultimate tensile strength: | 210 ksi |
| Elongation to failure: | 12.5% |
| Maximum strain recovery: | 8% |
| Alloy #3 (high-temperature, shape memory): | 55.5 ± 0.5 wt % Ni, balance of Ti, |
| | ≤0.05 C, O, Fe, ≤0.005 H, |
| | ≤0.01 other trace elements |
| | A(s) = 95 degrees C. ± 5 |
| | A(f) = 115 degrees C. ± 5 |
| typical tensile properties of cold-drawn and tempered material: | |
| Ultimate tensile strength: | 180 ksi |
| Elongation to failure: | 12% min. |

-continued

| | |
|---|---|
| Maximum strain recovery: | 8% |
| Alloy #4 (body-temperature): | 55.5 ± 0.5 wt % Ni, balance of Ti, $\leq$0.05 C, O, Fe, $\leq$0.005 H, $\leq$0.01 other trace elements A(s) = 15 degrees C. ± 5 A(f) = 35 degrees C. ± 5 |
| typical tensile properties of cold-drawn and tempered material at 36–38 degrees C.: | |
| Upper superelastic plateau stress: | 50 ksi |
| Lower superelastic plateau stress: | 2 ksi |
| Permanent set after 6% strain: | 0.5% |
| Ultimate tensile strength: | 180 ksi |
| Elongation to failure: | 12% min. |
| Maximum strain recovery: | 8% |
| Alloy #5 (chrome-doped, superelastic): | 55.8 ± 0.5 wt % Ni, balance of Ti, 0.2–0.3 Cr, $\leq$0.05 C, O, Fe, $\leq$0.005 H, $\leq$0.01 other trace elements A(s) = −30 degrees C. ± 5 A(f) = −10 degrees C. ± 5 |
| typical tensile properties of cold-drawn and tempered material: | |
| Upper superelastic plateau stress: | 80 ksi |
| Lower superelastic plateau stress: | 35 ksi |
| Permanent set after 6% strain: | 0.1% |
| Ultimate tensile strength: | 225 ksi |
| Elongation to failure: | 10% min. |
| Maximum strain recovery: | 8% |
| Alloy #6 (high-strength, superelastic, Ni—Ti—Fe): | 53.5 ± 1.0 wt % Ni, balance of Ti, 1.0–2.0 Fe, $\leq$0.05 C, O, $\leq$0.005 H, $\leq$0.01 other trace elements A(s) = −30 degrees C. ± 5 A(f) = −10 degrees C. ± 5 |
| typical tensile properties of cold-drawn and tempered material: | |
| Upper superelastic plateau stress: | 100 ksi |
| Lower superelastic plateau stress: | 65 ksi |
| Permanent set after 6% strain: | 0.5% |
| Ultimate tensile strength: | 210 ksi |
| Elongation to failure: | 10% |
| Maximum strain recovery: | 8% |

In comparison to other metals typically used in the manufacture of jewelry, and in particular in comparison to metals having structural properties considered as good, such as for example stainless steel, Nitinol exhibits dramatically increased tensile strength, at least an order of magnitude greater than stainless, and greater flexibility, at least 50 percent greater than stainless, and much greater superelasticity characteristics. Individual wire strands or thin rods may be intertwined to create bundles of strands or cables, with varied pitch, helix angle, diameters, etc.

Nitinol may also exhibit pseudoelastic properties, which occurs in a relatively narrow temperature range slightly above the stress-free austenite to martensite transformation temperature, and involves the creation of stress-induced martensite which simultaneously undergoes strain as it forms to relieve the applied stress. When the applied stress is removed, the thermally unstable martensite reverts to austenite, and the strain spontaneously returns to zero. This behavior gives a very high apparent elasticity to the material without inducing any permanent strain, but is limited in the temperature range where it can be utilized in a given alloy. Outside of the temperature range, heat will be required to resume the memory shape after deformation.

Objects of this invention are to provide for jewelry which is composed in whole or in part of a shape memory alloy, and in articular of Nitinol, such that the mechanical memory characteristics and/or superelasticity characteristics of the alloy are utilized to improve the ease of manufacture, to enable jewelry to be manufactured in ways which cannot be accomplished by non-shape memory alloys, to provide new manufacturing methods utilizing shape memory alloys, to provide cast pieces of jewelry, jewelry containing shape memory alloy members, wires or braided wire as support members and/or aesthetic elements, and jewelry composed of braided wires to form cable pieces, wherein the superelasticity and shape memory characteristics improve the durability, functionality and ease of repair of the jewelry pieces.

SUMMARY OF THE INVENTION

The invention comprises jewelry containing components composed of a shape memory alloy, and in particular the shape memory alloy Nitinol, as well as methods of forming such jewelry. The jewelry may comprise components or elements cast from the alloy, components used as support or gem stone mounts, and components or elements formed of wires, rods or other shapes, and braided or stranded wires which form cable. The jewelry comprises necklaces, bracelets, gem stone mounts, earrings, rings, etc. The jewelry may be comprised of mixed components, some of which are made of shape memory alloys and some of which are not, such as precious metals including gold and silver, stainless steel, etc.

The method of manufacture includes the creation of a jewelry piece by imparting a fixed shape into the shape memory alloy wire component through thermal exposure with the wire constrained in a desired configuration, which may be accomplished by wrapping the wire around a mandrel of desired configuration, such as circular or elliptical in cross-section, in extended lengths or in desired short segments, or forming the wire around particularly shaped forms of any choosing. This is followed by rapid cooling to set the crystalline phase. The wire component is then worked as necessary to create the piece of jewelry, such as by threading decorative pieces onto the wire, intertwining or braiding multiple wires to form cable for necklaces, bracelets or the like, or by incorporating the wire into other aesthetic pieces. If the superelastic properties are properly selected, the piece will have high flexibility and superior tensile strength, yet be elastic enough to resist breaking and kinking. If the shape memory properties are properly selected, the jewelry can be repaired if the wire components become bent or kinked by heating the piece above the transition or phase change temperature to return the alloy to its fixed memory shape. This shape memory can also be utilized during the construction of jewelry pieces, where it may be necessary to bend or kink the Nitinol wire elements during assembly steps. The wire component is imparted with the desired finished product shape. After the piece has been fully assembled, such that the wire is now bent or kinked in an undesirable manner, the piece is heated above the transition temperature such that the wire component returns to its desired memory shape.

The method of manufacture may also include the use of laser welding to join the shape memory alloy to connectors made of precious metal, stainless steel or other non-precious metals, or synthetic materials, since common joining techniques such as soldering will discolor the alloy and because the alloy will not in certain instances directly bond to certain precious or non-metal metals. The alloy, if unplated, will have a black Ni—Ti oxide outer coating which imparts an acid resistant outer grain boundary, and which can be cold formed into the outer surface followed by a heat treatment to increase the surface hardness of the alloy member. The alloy can also be plated to alter its external appearance.

DETAILED DESCRIPTION OF THE INVENTION

The invention comprises in general various embodiments of jewelry consisting of or containing components formed of a shape metal alloy, preferably Nitinol, most commonly in a wire, braid or cable form, and the invention further comprises various embodiments of methods of manufacture for such jewelry.

Nitinol is the generic name for a shape memory metallic alloy composed primarily of nickel and titanium, with small or trace amounts of iron, copper, zinc, aluminum, oxygen, hydrogen, nitrogen or other elements—some added to impart certain characteristics, the others being present as impurities. Nitinol comprises from approximately 50 to 60 wt percent Ni and approximately 40 to 50 wt percent Ti. Variations in the component percentages produce wires having different properties. A typical Nitinol wire composition, for example, comprises 55% Ni, and is designated Nitinol-55. Nitinol has a black color and readily develops oxides on the surface. Other shape memory alloys include combinations of copper-aluminum-nickel, gold-cadmium, copper-zinc aluminum, silver cadmium, silver-zinc, copper-aluminum and copper-zinc.

A preferred configuration for the shape memory structural component of the jewelry is a relatively thin wire, preferably about 0.004 to 0.020 inches in diameter, but which may be larger or smaller if desired. The wire may be utilized individually or in multiples, and in many applications is braided by patterned winding about a core or with intertwining wires to create a braid or cable composed of multiple wires, with the braided bundle or cable being suitably from about 0.48 to 10 millimeters in diameter for ease of handling and aesthetic appearance, although again larger or smaller diameters are possible. The braid or cable can be composed entirely of Nitinol wires, or wires of gold, silver, stainless steel or other metals may be used in combination with the Nitinol wire or wires to create patterns. The braiding or winding is best performed mechanically. The Nitinol wire or wires, or an internal braided Nitinol cable itself, may be used as an inner core for structural purposes alone, hidden by externally wound wires or cables of other metal, or the black Nitinol may be used as an exposed decorative element in the finished product. The Nitinol wire can be used as a necklace or bracelet to retain other jewelry pieces, such as beads, pendants or the like, or the braided cable in and of itself can be worn as jewelry, formed into rings, earrings, watchbands, pendants, etc.

Figure 1:
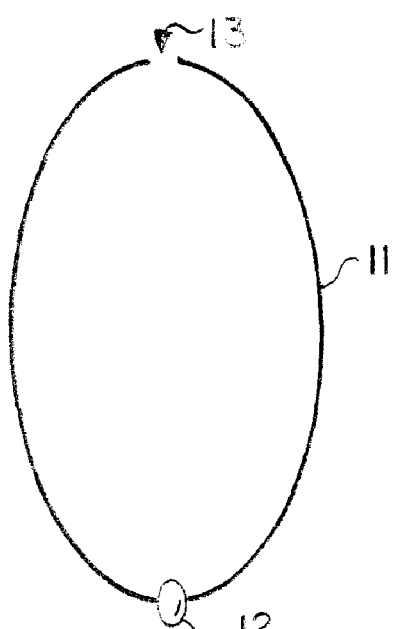
FIG. 1 shows a necklace comprising a single Nitinol wire as the support for a pendant and as a decorative element.
Figure 2:
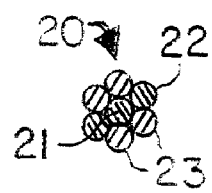
FIG. 2 is a cross-sectional view showing a multi-wire braid or bundle having a Nitinol core wire surrounded by Nitinol wires and non-Nitinol wires.
Figure 3:
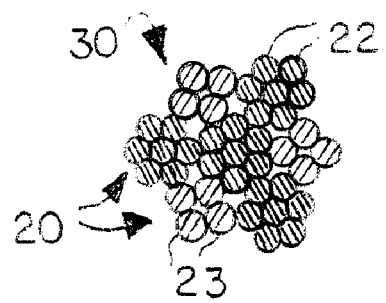
FIG. 3 is a cross-sectional view showing a cable comprising multiple wire bundles, the cable having a core bundle composed fully of Nitinol wires, with some outer bundles being Nitinol wires and some outer bundles being non-Nitinol wire bundles.

For example, FIG. 1 illustrates a necklace comprised of a single Nitinol wire 11 structural component which supports a pendant 12 and has a gap 13 to allow the wearer to place it around her neck. The necklace is provided with an elliptical memory shape. Bracelets, rings, earrings and the like can also be formed in equivalent manner. FIG. 2 shows a bundle or braid 20 of wires, where a core wire 21 of Nitinol is provided which is covered by external wires 22 and 23, where wires 22 represent Nitinol wires exposed for aesthetic purposes and wires 23 represent non-Nitinol wires, such as gold, silver or the like. Alternatively, the bundle 20 can be formed with only non-Nitinol wires 23 on the outside, or may be formed totally from Nitinol wires 22. In FIG. 3, bundles 20 are combined to form a cable 30. Again alternative combinations of Nitinol wires 22 and non-Nitinol wires 23 may be utilized as desired.

Initially wire on spools may be annealed at high temperature to release any manufacturing stresses or to straighten it. The wire is passed from one reel to another through a high temperature zone to accomplish this. This technique can also be used to impart a linear shape to the wire by applying tensile stress during the process. Alternatively, long lengths of the wire or cable can be wound onto a mandrel and then annealed to impart a desired shape. The cross-sectional configuration of the mandrel may be circular, elliptical, tear-drop, etc. Alternatively as well, the wire or cable can be cut to desired lengths for each jewelry piece, shaped individually by hand or on a mandrel or form, then thermally processed to impart the desired shape. Temperatures for the stress relaxation annealing and the memory-imparting or hardening annealing will vary according to wire composition and configuration, with thicker components and braided components taking more time and/or higher temperatures. Preferably, temperatures of about 350 to 500 degrees C. or higher are used to set the shape and properties of the Nitinol, followed by rapid cooling in a water quench or rapid air quench. Such techniques are known in the art.

By imparting the jewelry with a shape memory desired configuration, the wires or cables can be heated to return the wire or cable to the desired shape should the jewelry be damaged. For example, a necklace consisting of a Nitinol wire which is strung with beads, a pendent, or the like, may have the Nitinol support wire memory shaped on an elliptical or tear-drop shaped mandrel to impart the desired final configuration. Should the necklace be crimped or kinked, the necklace can be heated above the transition temperature, typically approximately 40 to 160 degrees C. but dependent on the articular Nitinol alloy, at which point the shape memory alloy will spring back to its fixed, i.e., elliptical or tear-drop, memory shape, and the kinks or bends will no longer be present. Contrast this with a standard stainless steel necklace, where any significant bend or kink is for practical purposes a permanent feature which is not readily fixable. Likewise, the memory shape characteristic can be utilized with braids or cables of Nitinol wires to repair bends, kinks or other unwanted deformations.

Alternatively, the properties of the shape memory alloy can be utilized where the manufacturing process required to create a finished piece of jewelry requires that the wire or cable be bent, crimped, coiled, etc. during assembly. Once the jewelry is finished, the deformed wire or cable can be returned to its original shape by raising the temperature above the phase change transition point, followed by cooling. With this method, complicated or intricate pieces of jewelry requiring deformation of the wire or cable to create the piece can be achieved, since any damage done during the creation of the piece can be easily reversed.

Jewelry pieces can also be cast in the desired shape from the molten alloy, with the finished piece treated to impart the shape memory. For example, gem stone mounts or rings can be cast, or simply fabricated from larger diameter Nitinol rods, bars or sheet stock, where an incomplete circle is formed of the rod or bar with a separation gap smaller than the width of the stone to be maintained therein. This shape is fixed by the temperature treatment process. Once cooled well below the transition temperature, the gap is widened to insert the stone, which will be held temporarily by the tensile force of the circle. Raising the temperature of the circle above the transition point causes the ring to tighten into its fixed memory shape, which securely binds the stone within the gap. Other mounting components, such as prongs or barrel mounts, can likewise be produced. As before, the final shape is first imparted through annealing and cooling, the mount is deformed to accept the gem stone, and then reheated above the transition temperature to secure the stone in place.

In other circumstances, the superelastic properties of Nitinol may be a more desired characteristic than its shape memory properties. With proper choice of alloy and processing, the usable temperature range under which the Nitinol exhibits the pseudoelastic response can provide for a jewelry piece having high flexibility and tensile strength, yet which is elastically elongatable or bendable over a significant percentage without breaking or resulting in plastic or permanent deformation Nitinol and other alloys will become coated with a Ni—Ti oxide, especially when annealing is performed in atmosphere. The oxide is a desired characteristic to present a black, shiny outer surface which is resistant to degradation from body acids and salts. This oxide can be cold formed into the surface of the wire to increase its hardness prior to a subsequent annealing step.

Nitinol and many other alloys will not bond directly with precious metal such as gold or silver. In order to attach clasps or other connection elements to the wire or cable, the normal method of soldering is not suitable, since the process will discolor the Nitinol. Instead, laser welding is utilized, where the caps or other connector members of titanium or the like are joined to the Nitinol by fusing the connector members to the wire or cable. The caps or connectors may be internal members, such as externally threaded sleeves, onto which external caps or connectors of precious metal or the like can be mechanically joined. The caps are welded by providing tiny holes at spaced locations when the design of the cap is such that the laser beam cannot reach the junction between the cap and the wire. Alternatively, bonding with epoxy compounds may be utilized.

The Nitinol can also be plated by first providing a coating of nickel, which will bond to the Nitinol, and then coating the nickel with the desired external coating, such as gold.

It is understood that certain equivalents and substitutions may be obvious to those skilled in the art, the above examples being exemplary in nature, and therefore the true scope and definition of the invention is to be as set forth in the following claims.

I claim:

1. An article of jewelry comprising a flexible structural component comprised of a shape memory alloy, wherein the structural component comprises multiple wires composed of between approximately 50 to 60 wt percent Ni and between approximately 40 to 50 wt percent Ti and being characterized by having a pre-determined memory shape and a capacity upon thermal treatment to resume said memory shape after plastic deformation.

2. The article of jewelry in claim 1, where said structural component comprises a cable formed from said multiple wires composed of between approximately 50 to 60 wt percent Ni and between approximately 40 to 50 wt percent Ti.

3. The article of jewelry in claim 1, where said structural component is further characterized by being superelastic.

4. The article of jewelry in claim 1, the structural component further characterized by an elongation to failure of at least 10 percent, a tensile strength of greater than 155 ksi, and a maximum strain recovery of 8 percent.

5. An article of jewelry chosen from the group of articles of jewelry consisting of necklaces, bracelets, earrings, gemstone settings and rings, said article of jewelry comprising a flexible structural component having multiple wires comprising a shape memory alloy which is subject to plastic deformation, and wherein said multiple wires are composed of between approximately 50 to 60 wt percent Ni and between approximately 40 to 50 wt percent Ti, wherein said structural component is characterized by having a pre-determined memory shape, and further where said structural component is characterized by a capacity upon thermal treatment to resume said memory shape after plastic deformation of said structural component, such that plastic deformation of said structural component is removed by said thermal treatment.

6. The article of jewelry in claim 5, where said structural component comprises a cable formed from said multiple wires composed of between approximately 50 to 60 wt percent Ni and between approximately 40 to 50 wt percent Ti.

7. The article of jewelry in claim 5, where said structural component is further characterized by being superelastic.

8. The article of jewelry in claim 5, the structural component further characterized by an elongation to failure of at least 10 percent, a tensile strength of greater than 155 ksi, and a maximum strain recovery of 8 percent.

* * * * *